(No Model.)
G. BOLD & J. E. OLDHAM.
FOOT POWER FOR PROPELLING BOATS.
No. 514,640. Patented Feb. 13, 1894.
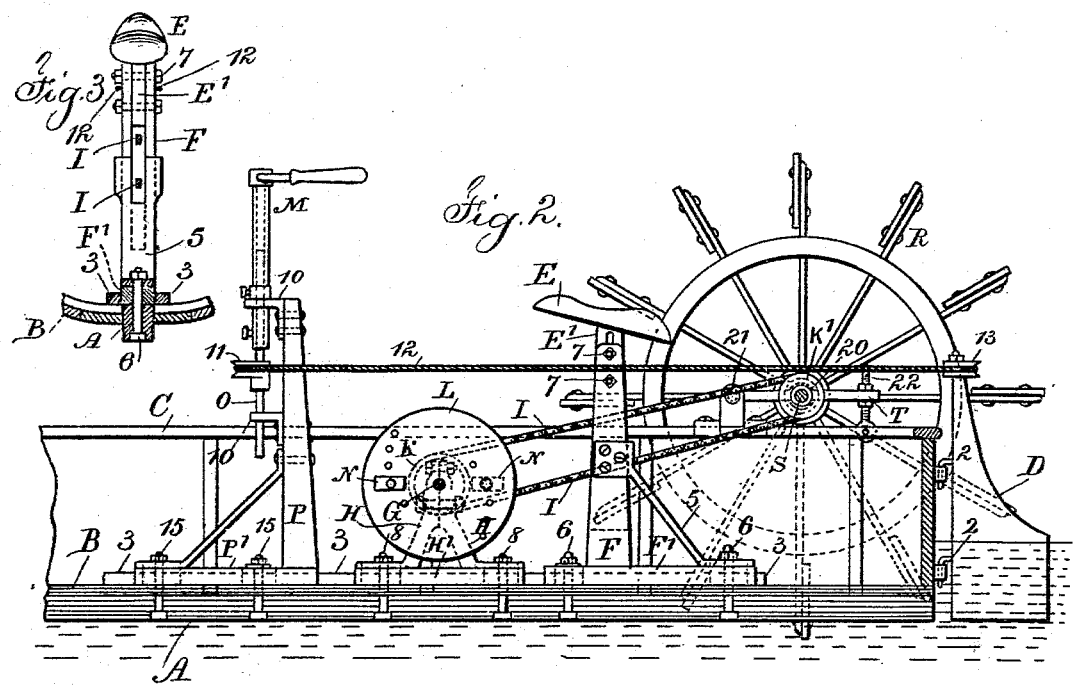
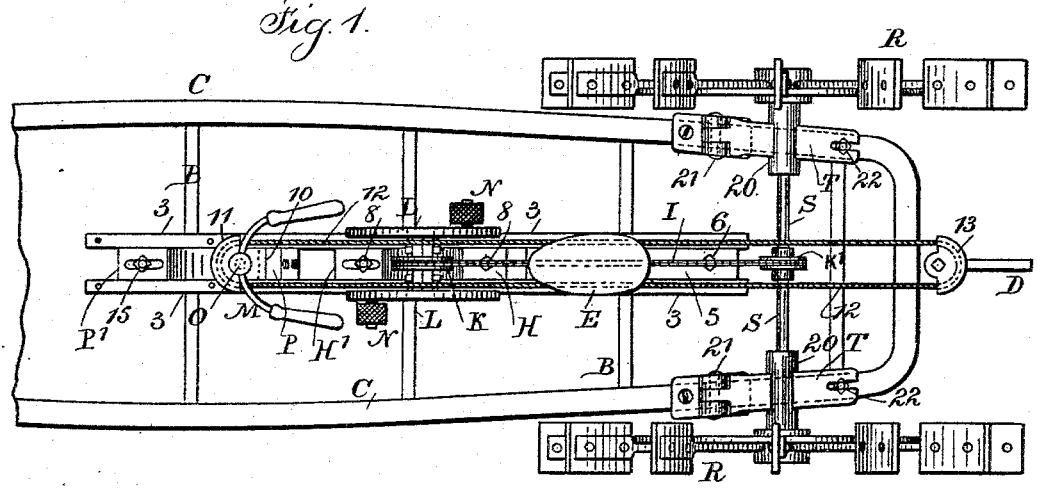
Witnesses,
Chas. H. Smith
J. Staib
Inventors
George Bold
James E. Oldham
per Lemuel W. Serrell
Atty.

UNITED STATES PATENT OFFICE.

GEORGE BOLD AND JAMES E. OLDHAM, OF PLAINFIELD, NEW JERSEY.

FOOT-POWER FOR PROPELLING BOATS.

SPECIFICATION forming part of Letters Patent No. 514,640, dated February 13, 1894.

Application filed September 11, 1893. Serial No. 485,228. (No model.)

*To all whom it may concern:*

Be it known that we, GEORGE BOLD and JAMES E. OLDHAM, citizens of the United States of America, residing at Plainfield, in the county of Union and State of New Jersey, have invented an Improvement in Foot-Power for Propelling Boats, of which the following is a specification.

The present improvements relate to the peculiar construction and arrangement of devices by which a saddle for the person propelling the boat is adjusted in reference to the pedals that are used for rotating balance wheels and a sprocket wheel for a chain leading to the propeller. The support for the sprocket wheel is adjustable lengthwise of the boat for tightening the chain, and an adjustable post and handle bar are provided with a connection to the rudder.

In the drawings, Figure 1 is a plan showing the improvement within the stern of a boat. Fig. 2 is an elevation of the same partially in section, and Fig. 3 is a cross section of the keel and slide way for the support.

The boat is of any desired size or shape. We have shown part of a boat with the keel A, ribs and planking B and gunwale C, and at D is the rudder supported on the pintles 2 2.

Along on the bottom of the boat the strips 3 3 are permanently fastened adjacent to or upon the top surface of the keel A, and these form a slide-way for receiving and supporting the respective parts of the mechanism and in which slide-way such parts may be adjusted longitudinally of the boat.

The saddle E is adapted to receive the driver that propels the boat. This saddle is upon the bar E', that is adjustable vertically within the divided post F that is permanently connected with the base F' and strengthened by the brace 5. The base F' fits between the strips 3 3 and is movable longitudinally of the boat in the slide-way, and there are bolts 6 passing through slots in the base and into the keel for securing the saddle post and saddle in position when adjusted; and by the clamp bolts 7 passing through holes or slots, the saddle bar E' and the saddle can be held rigidly when the saddle is adjusted to the proper height. These devices also allow the seat to be adjusted relatively to the pedals.

The pedal shaft G passes through supports H that are upon the base H' that is fitted to slide longitudinally of the boat in the slide-way between the strips 3 3, and the bolts 8 passing through slots in the base H' and into the keel serve to hold the parts when adjusted, the object of the adjustment being to tighten the chain I that passes around the sprocket wheel K upon the pedal shaft G and is led to a sprocket wheel on the propelling device.

The fly-wheels L upon the outer ends of the shaft G receive the pedals N, which pedals are of any suitable character and adapted to the feet of the person driving the boat. They are preferably at one hundred and eighty degrees apart. The fly-wheels serve to render the rotation of the propelling device regular and uniform. There are holes in the fly-wheels at different distances from the shaft, so as to set the pedals at greater or less distances from the axis of rotation.

In order to steer the boat, we make use of the handle bar M having a vertical spindle O that passes through the brackets 10 on the steering post P and is provided with a segment 11 or cross bar with cords or ropes 12 to the segment or cross bar 13 on the rudder head, and the steering post P is adjustable longitudinally of the boat so as to be in the most convenient place for the person driving the boat. With this object in view the base P' of the steering post is in the slide-way between the strips 3 and held by screws or bolts 15 passing through slots in the base P' into the keel.

The devices before described are adapted to any kind of propeller; we however have shown and prefer to use the paddle wheels R upon the cross shaft S, upon which shaft is the sprocket wheel K' for the chain I, and by varying the relative sizes of the sprocket wheels K and K', the revolutions of the propelling wheel can be greater or less than the pedal shaft. The slotted base H' allows for adjusting the parts to suit different sizes of sprocket wheels with the same chain.

In foot power boats the draft varies according to the number of persons in the boat and it is important to be able to raise or lower the paddle wheel shaft. With this object in view the boxes 20 are permanently fastened on levers T that are pivoted at 21 upon the gunwale of the boat, and the screws 22 are also pivoted at their lower ends upon the gunwale and pass through slots in the levers T and the nuts upon the screws above and below the levers hold the parts and allow for raising or lowering the paddle shaft and wheels.

The chain I passes through the two part post F so as to be out of the way of the feet and legs of the person driving the boat.

In place of the screws 22, wedges may be used or slotted wedges may be put under the levers T in place of the lower nuts on the screws.

We claim as our invention—

1. The boat having strips 3 secured upon the bottom of the boat adjacent to the keel and forming a longitudinal slide-way, in combination with the saddle and its post and base, and the sprocket wheel, shaft and pedals and the support and base for the same, and bolts passing through slots in the respective bases and into the keel, whereby the saddle and the sprocket wheel are adjustable longitudinally of the boat, and a chain from the sprocket wheel to the propelling device, substantially as set forth.

2. The combination with the boat and a paddle wheel and shaft, of a saddle, a two-part saddle post and base, a sprocket wheel and shaft, and fly-wheels and pedals, a support and base for the sprocket wheel shaft, and bolts passing through slots in the bases and adjustably securing the same to the keel, a sprocket wheel on the paddle shaft and a chain from the same to the driving sprocket wheel, said chain passing through the divided saddle post, substantially as set forth.

Signed by us this 2d day of September, 1893.

GEORGE BOLD.
JAMES E. OLDHAM.

Witnesses to signature of Bold:
LEMUEL W. SERRELL,
MARY F. HAND.

Witnesses to signature of Oldham:
D. GARRISON,
HOWARD BORDEN.